United States Patent [19]

Smith

[11] Patent Number: 4,644,206

[45] Date of Patent: Feb. 17, 1987

[54] CONTINUOUSLY VARIABLE TORQUE CONVERTER

[76] Inventor: Christopher D. Smith, 43 Hasbrouck Pl., Rutherford, N.J. 07070

[21] Appl. No.: 665,318

[22] Filed: Oct. 26, 1984

[51] Int. Cl.$^4$ .......................................... H02K 23/60
[52] U.S. Cl. .................................. 310/115; 310/102 R
[58] Field of Search ................... 310/94, 96, 105, 112, 310/115; 180/65.1, 53.1, 70.1; 192/12 D

[56] References Cited

U.S. PATENT DOCUMENTS 2,629,062  2/1953  Seede .................................... 310/115

FOREIGN PATENT DOCUMENTS 654663  12/1937  Fed. Rep. of Germany ...... 310/115
677215  6/1939   Fed. Rep. of Germany ...... 310/115
739762  10/1943  Fed. Rep. of Germany ...... 310/115
1285425 1/1962   France .............................. 310/115

Primary Examiner—Peter S. Wong
Assistant Examiner—D. L. Rebsch

[57] ABSTRACT

An electromagnetic transmission has three cylindrical structures concentric about a common longitudinal axis, the inner structure being a rotatably mounted primary armature having an input shaft extending along the axis and connected to a prime mover capable of rotating the primary armature, the outer structure being a stationarily mounted secondary armature, and the intermediate structure being a rotatably mounted field member having an even number of pole shoes whose surface-to-surface spacing from the primary and secondary armatures define the primary and secondary air gaps of the electromagnetic transmission, the field member having an output shaft extending along the axis for connection to a mechanical load.

9 Claims, 13 Drawing Figures

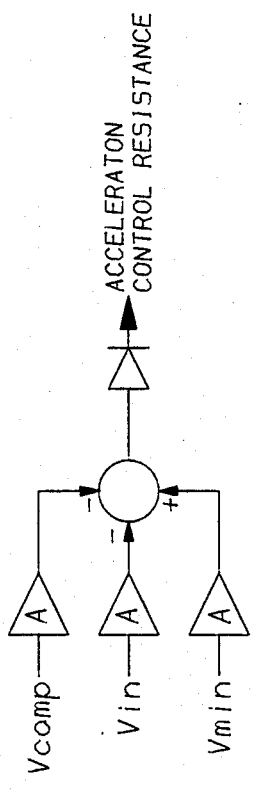
FIG. 10
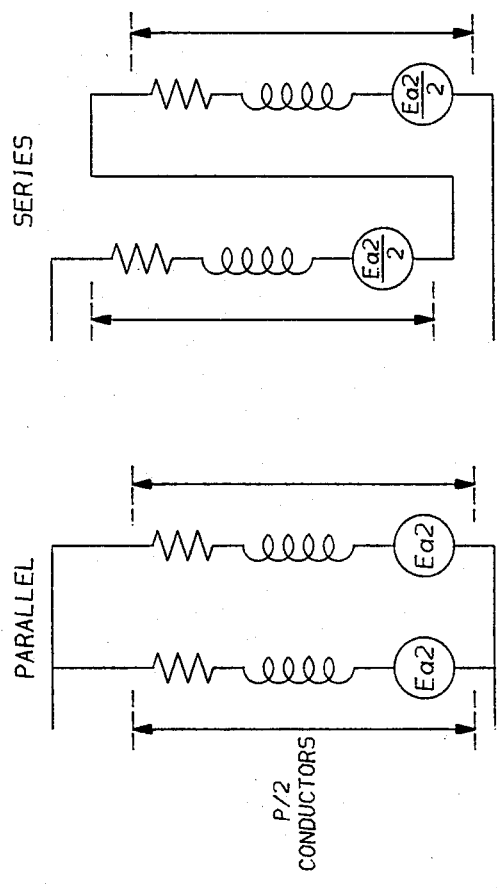
FIG. 11A
FIG. 11B

CONTINUOUSLY VARIABLE TORQUE CONVERTER

This invention relates to electromagnetic transmissions and, more particularly, to electromagnetic transmissions of the continuously variable torque converter type.

BACKGROUND OF THE INVENTION

The concept of using an electromagnetic transmission to transfer power from one rotating shaft to another was proposed over a half century ago. Through the years, this type of transmission has been refined to provide better control of the torque ratio and more efficient operation; but, despite these efforts, the electromagnetic transmission has seen only limited practical use.

Almost without exception, typical electromagnetic transmissions include two rotating armatures whose shafts are connected in some fashion to one or more planetary gear trains. One of these armatures, referred to as the primary armature, is also rigidly connected to the power input shaft. The other armature, referred to as the secondary armature, is neither necessarily nor usually connected directly to the power output shaft of the transmission.

The physical makeup of such electromagnetic transmissions usually incorporates the two rotating armatures mounted adjacent to one another on concentric shafts, and a single stationary field structure supplied with current from an external source or from the generating armature. The output shaft of such a transmission is rigidly connected to an element of the planetary gear train such that its rotation will be some linear combination of the rotational velocities of the two armatures. In the low end of the velocity range (which may include negative velocities), the secondary armature acts as a generator supplying direct current to the primary armature which acts as a motor. At higher speeds, the roles of the two armatures are reversed and the primary armature, then acting as a generator, supplies direct current to the secondary armature, then acting as a motor.

The ratio of output shaft torque to input shaft torque is determined by the direction and magnitude of current flow between the primary and secondary armatures. To establish the correct flow of current from one armature to the other, one or more sets of movable commutator brushes are employed which allow the induced voltage of either or both armatures to be controlled within limits determined by the rotational velocities of the armatures. By rotating the brushes about the armature axis away from what is known as the quadrature-axis, the induced emf of a rotating armature can be reduced from a maximum. The voltage control of the armatures, in turn, dictates the current flow between the armatures.

The chief disadvantages of electromagnetic transmissions of the continuously variable torque converter type discussed above are, for the most part, related to their complexity as compared with, for example, fluid torque converters with their associated gearing. Probably the single most costly and troublesome component of even modern versions of such electromagnetic transmissions is the movable brush assembly and associated controller. Noteworthy in this respect are the limitations placed on the power rating of a DC machine by the commutating process. If the voltage across the brush terminals is too great, excessive brush and commutator wear can result.

SUMMARY OF THE INVENTION

With the foregoing in view, an aim of the invention is to use two concentric armatures rather than two adjacent armatures; and, furthermore, to make the outermost armature (the secondary armature) stationary, while the field structure, concentric with and between the armatures, will be free to rotate about the common axis. With this arrangement, the output torque of the transmission will be the sum of the torques exerted from the armatures on the field structure.

Another aim of the invention is to avoid using brushes and a rotating commutator with the secondary armature and, instead, control the configuration of the secondary armature windings with magnetic pick-ups working in conjunction with solid-state logic circuits.

Another aim of the invention is to configure the secondary armature windings according to an algorithm specified by a digital controller, and thereby render the transmission very easily programmable to accommodate various response requirements including, for example, constant torque output, constant speed output and linearly increasing torque according to power input.

Another aim of the invention is to achieve in the transmission the quality of being infinitely variable without creating one or more offsetting deficiencies, such as losing the ability to maintain a uniform, maximum power output over the entire range of output shaft speed variation.

According to the invention, there is provided an electromagnetic transmission comprising three generally cylindrical structures concentrically disposed about a common longitudinal axis, the inner structure being a rotatably mounted primary armature having an input shaft extending along said primary armature about said axis, the outer structure being a stationarily mounted secondary armature, and the intermediate structure being a rotatably mounted field member having an even number of pole shoes whose surface-to-surface spacing from said primary and secondary armatures respectively defines the primary and secondary air gaps of the electromagnetic transmission, the field member having an output shaft extending along said axis for connection to a mechanical load.

Preferably, the input shaft extends through the primary armature and is journaled at its prime mover side in one end frame of the transmission housing incorporating the secondary armature, the extended side of the input shaft being journaled in one end frame of the field member. The output shaft is then advantageously journaled in the other end frame of the transmission housing and the other end frame of the field member is journaled on the input shaft.

The transmission utilizes only a single rotating commutator. This is fixed to the input shaft and electrically connected to the primary armature windings and it operates with brushes requiring no angular shifting from their neutral or quadrature axis which rotates with the field member. The windings of the secondary armature are arranged to be controlled in their configuration by control means capable of continuously adjusting the number of secondary armature conductors connected in series, the adjustment being performed in response to sensed variations in at least one performance parameter of the transmission.

Other aims, features and advantages of the invention will become apparent from the following description of the preferred embodiment in conjunction with the accompanying drawings.

BRIEF DESCRIPTION OF THE DRAWINGS

FIG. 10 is a block diagram of a unit suitable for setting the acceleration control resistance depicted in FIG. 9;

FIGS. 11A and 11B are schematic wiring diagrams of parallel and series connected secondary armature coils, respectively.

DESCRIPTION OF THE PREFERRED EMBODIMENT

Figure 1:
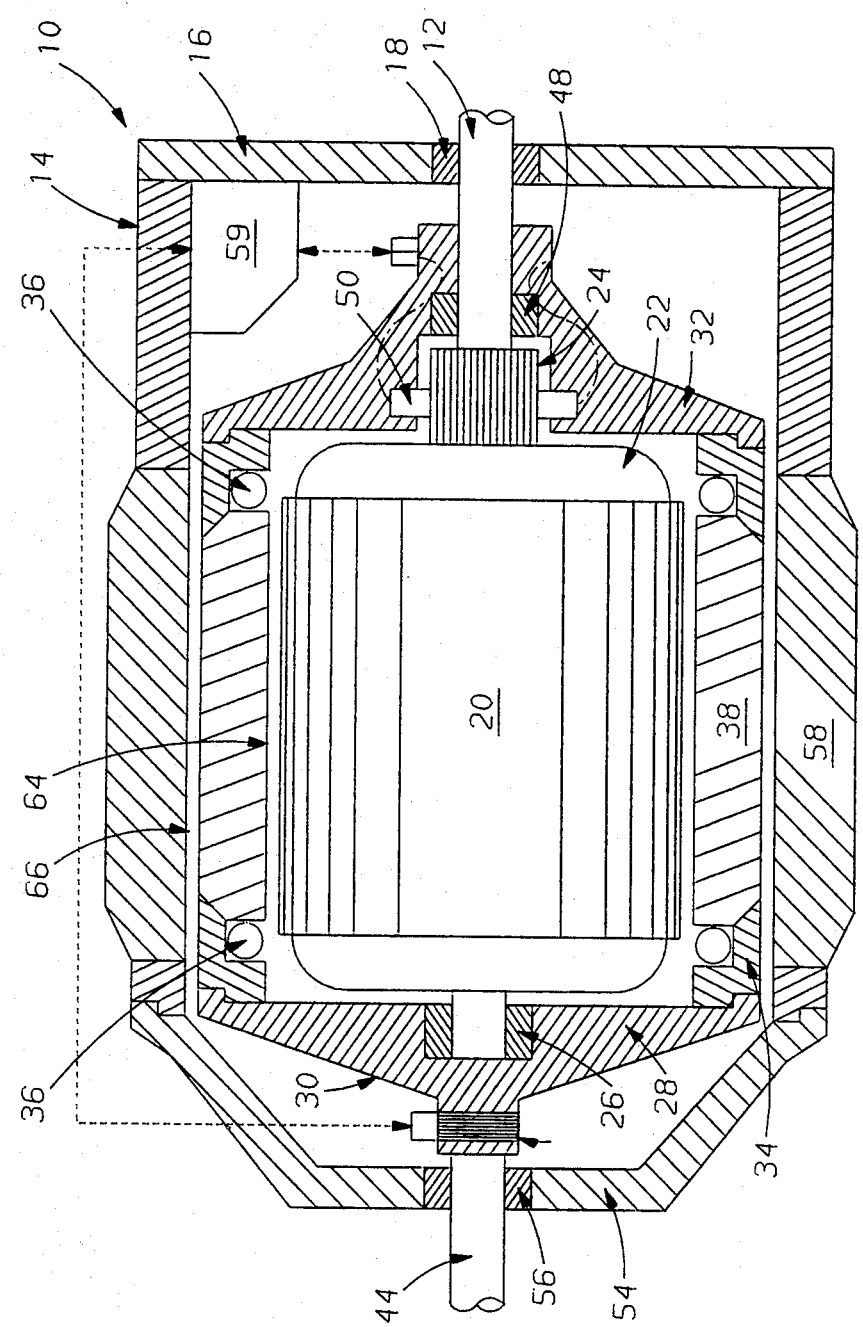
FIG. 1 is a view in elevation diagrammatically depicting transmission apparatus embodying the present invention.

With reference now to the accompanying drawings, designated generally at 10 is an electromagnetic torque converter which, for purposes of simplification, will hereinafter be referred to as the EMTC. A driven shaft 12, supplying mechanical power input to EMTC 10, enters a housing 14 through a housing end wall 16. In end wall 16 is a bearing 18 which supports input shaft 12. Rigidly connected to input shaft 12 is a primary armature 20 having armature windings 22 electrically connected to a commutator 24. Input shaft 12 extends through primary armature 20 and, at the end thereof remote from commutator 24, is supported by a bearing 26 which is mounted in a field rotor end section 28.

A field rotor 30 which includes end section 28 includes, also, an opposed end section 32, and is further provided with nonmagnetic sleeve 34 which supports an even number of field coils 36 surrounding magnetic field shoes 38. Field coils 36 are of two types: parallel connected main field windings 40 and series connected auxiliary windings 42. End section 28 is rigidly connected to an output shaft 44 and holds field slip rings 46 which electrically connect the field windings to their power source. End section 32 contains a bearing 48 which supports field rotor 30 on input shaft 12. End section 32 moreover contains commutator brush assemblies 50 (shown schematically) for primary armature 20, as well as armature slip rings 52 which connect windings 22 of primary armature 20 to the rest of the transmission circuitry. The brush assemblies for the two sets of slip rings 46 and 50 are shown schematically.

Output shaft 44 is supported in an end wall 54 of housing 14 by a bearing 56. End wall 54 is connected to the main structure of housing 14, and secondary (stationary) armature 58 is an integral part of such main housing structure. The conductors of the secondary armature windings 60 (FIG. 2) are parallel with the conductors of primary armature windings 22. Secondary armature core 62 (FIG. 2) is a hollow cylindrical member constructed of laminated magnetic material in which secondary armature windings 60 are embedded.

Figure 2:
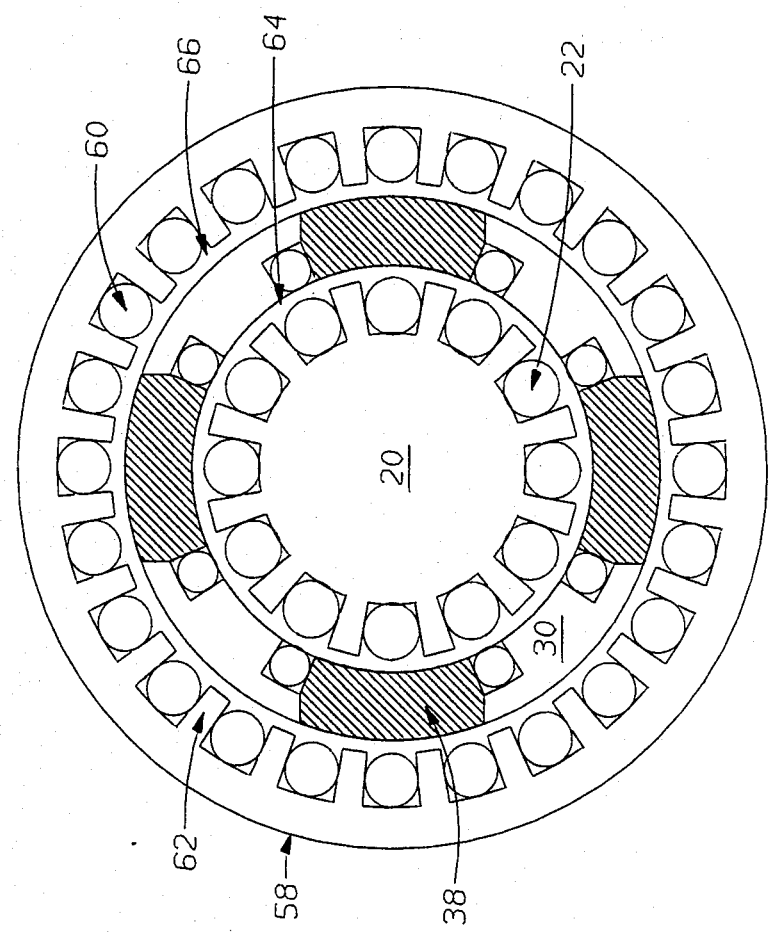
FIG. 2 is a cross-sectional view of the transmission apparatus shown in FIG. 1 taken at a plane perpendicular to the common axis of rotation of the field rotor and primary armature at a point approximately midway between the ends of the primary armature and showing armature conductors running parallel to the common axis of rotation.

In FIG. 2, the cylindrical concentricity and diametral relationship of rotatable primary armature 20, field rotor 30 and stationary secondary armature 58 are clearly seen, together with the flux-traversing air gap 64 between the primary armature and field rotor and the flux-traversing air gap 66 between the secondary armature and field rotor. A controller 58 (FIG. 1) for changing the configuration of secondary armature windings 60 is mounted on housing 14 in a convenient interior location near end wall 16. Controller 59 will be described in more detail hereinafter in conjunction with FIGS. 6-8.

Figure 3:
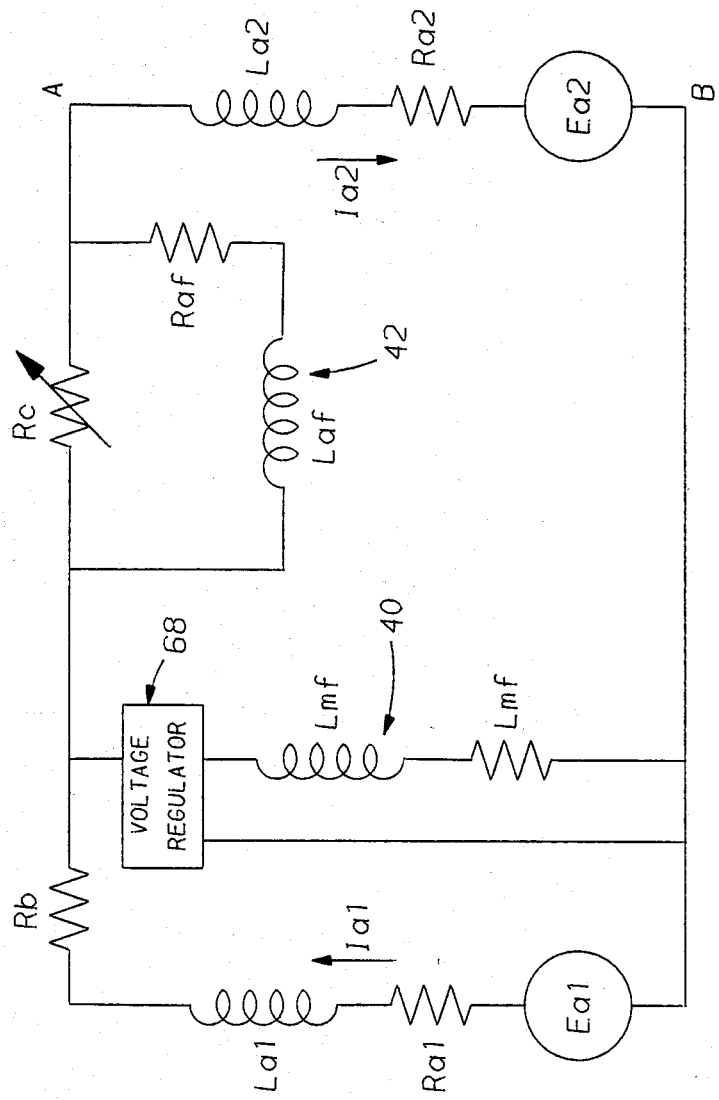
FIG. 3 is a schematic circuit diagram showing preferred electrical interconnections of armature and field windings.

There are several ways to set up the necessary electrical circuitry for EMTC 10. FIG. 3 shows preferred circuitry having three branches in parallel. The first branch contains, in series, the electromotive force $E_{a1}$ that is induced in primary armature windings 22, the resistance $R_{a1}$ of primary armature windings 22, the inductance $L_{a1}$ of primary armature windings 22 and the brush resistance $R_b$ of commutator brush assemblies 50 and armature slip rings 52. The second branch is stabilized in voltage drop by a voltage regulator 68 and it contains in series the resistance $R_{mf}$ of main field windings 40 and the inductance $L_{mf}$ of main field windings 40. The third branch contains, in series between d.c. power terminals A and B, the electromotive force $E_{a2}$ that is induced in secondary armature windings 60, the resistance $R_{a2}$ of secondary armature windings 60 and the inductance $L_{a2}$ of secondary armature windings 60. The second branch is in series with an auxiliary winding network enroute to being connected across supply terminals A and B in common with the third branch, the network having a variable resistor $R_c$ in parallel with a series connection of the inductance $L_{af}$ of the auxiliary field winding 42 and the resistance $R_{af}$ of the auxiliary field windings 42.

The principal difference between the EMTC circuitry of FIG. 3 and the other possible circuit arrangements is in the excitation of the field windings. One may, for example, choose to excite main field winding 40 and auxiliary field winding 42 with a power source that is separate from that connected across primary and secondary armatures 20 and 58. In such a case, the EMTC circuitry becomes a single series circuit. In effect, secondary armature 58 would act as a single load across the terminals of primary armature 20. However, in either case, the basic operation will remain fundamentally the same. Since direct current is supplied to main field winding 40, no reactive power is associated with the main field inductance $L_{mf}$. The power (voltage times current) supplied to main field winding 40 is dissipated by main field resistance $R_{mf}$. Regardless of the circuitry involved, this dissipated power must be considered a loss when calculating the efficiency of the system. Since the current drawn by main field winding 40 is typically very small, however, the loss is of minor significance.

Although the resistance and power dissipation of auxiliary field winding 42 are small, its circuit configuration is slightly more important to the operation of the system. As auxiliary field winding 42 may experience a varying current dictated by controller 59, a reactive power and a resistive power dissipation will be associated with auxiliary field winding 42. The effect of this winding on the time response of the system will be discussed hereinafter in conjunction with the operation of controller 59.

Figure 4:
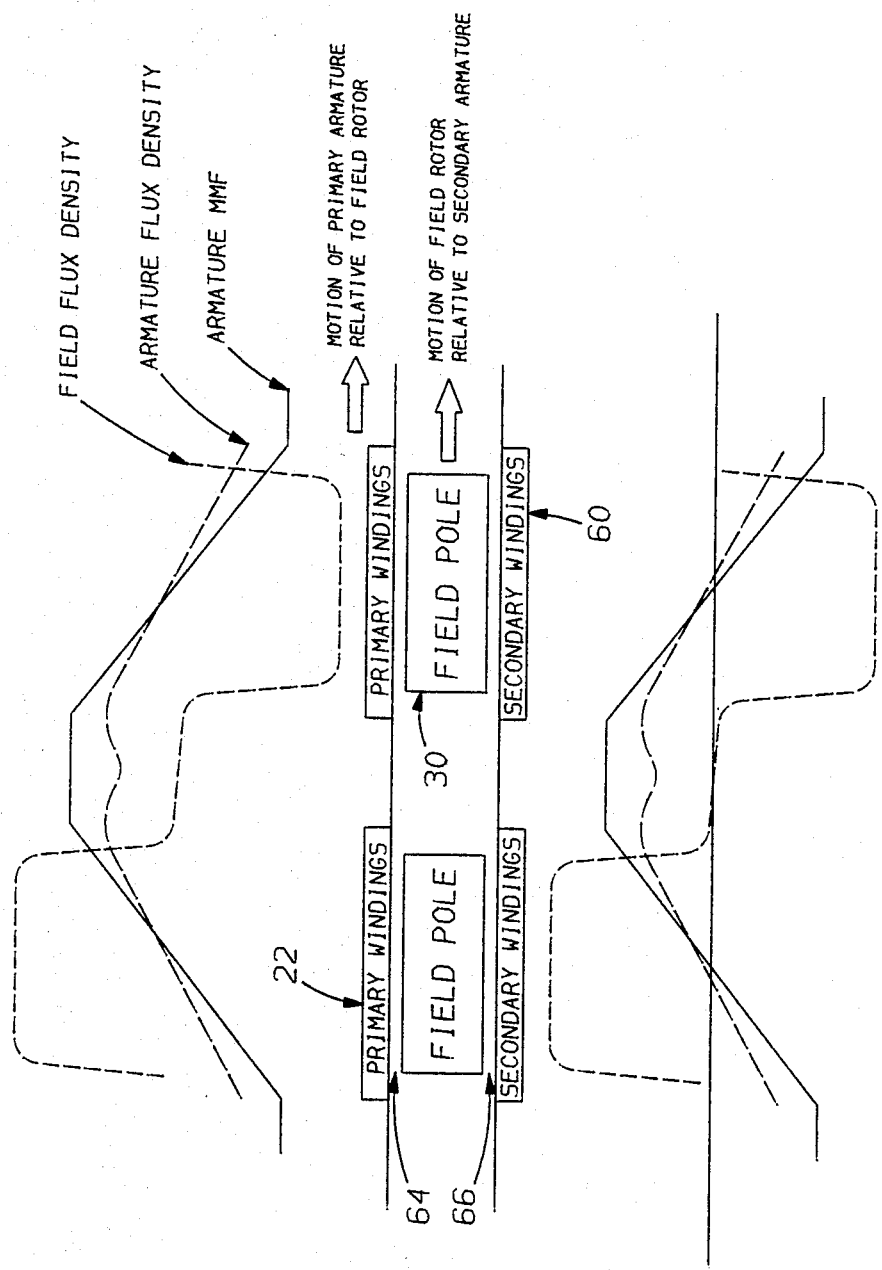
FIG. 4 is a representation of primary and secondary armature windings positioned at adjacent field poles of the field rotor, including a correlated graphical showing of flux density distributions in the air gaps.

The approximate flux density distributions in air gap 64 between field poles 38 and primary armature windings 22 and in air gap 66 between field poles 38 and secondary armature windings 60 due to the individual flux generating components of EMTC 10 are shown in FIG. 4. The circumference of each component is depicted as a straight line to facilitate illustration. The field flux density curve indicates what the flux density distribution would be due solely to main and auxiliary field windings 40 and 42 of field coils 36. Similarly, the armature flux density curves respectively indicate what the flux density distributions would be, due solely to primary armature windings 22 and secondary armature windings 60. Maximum winding currents are assumed for primary armature 20 and secondary armature 58. The magnitude of each armature flux relative to the field flux has been exaggerated in FIG. 4.

Figure 5:
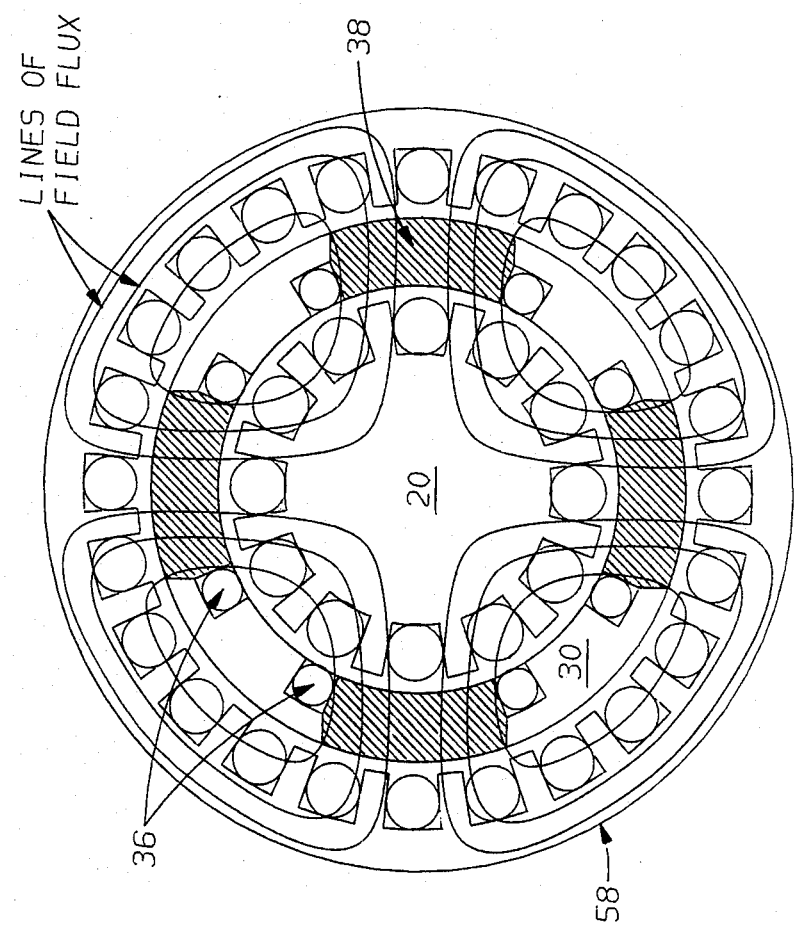
FIG. 5 is a cross-sectional view like that of FIG. 2, but showing lines of field flux crossing the air gaps.

FIG. 5 shows EMTC 10 in cross-section with the approximate flux pattern obtained when only the main field windings 40 of field coils 36 are excited. In EMTC 10, the primary armature flux and secondary armature flux will only slightly distort the field flux pattern and just barely affect the magnitude of the average air gap flux density. Furthermore, the effects of the secondary armature flux on the action of the primary armature with respect to the field rotor and the effects of the primary armature flux on the action of the secondary armature with respect to the field rotor will be negligible due to the large separation (two air gaps and field rotor 30) between the armatures. The air gap fluxes in EMTC 10 are, for all intents and purposes, independent of the primary and secondary actions.

The field flux depends on the reluctance of the magnetic circuit and on the field winding configuration. Since the magnetic reluctance of the iron in primary armature 20 and secondary armature 58 and in field poles 38 of EMTC 10 is very small, the flux is confined essentially to these components and to the air gaps at the pole faces. Field rotor sleeve 34, which is constructed of a nonmagnetic material such as aluminum, supports little magnetic flux (see FIG. 5). As a result, the fluxes at opposite faces of a pole are approximately equal in magnitude. Hence, it shall be assumed hereinafter that the air gap fluxes in the primary and secondary air gaps are of equal magnitude and are identical to the field flux.

As an introduction to the description of controller 59 depicted in FIGS. 6 and 7, there will now be explained the derivation of four equations which are characteristic of the system and which determine the design and operation of the controller.

Although EMTC 10 is a compound system with two armatures and a rotating field member, the standard techniques used to analyze simple DC machines may be applied to EMTC 10 as well. In a DC machine (motor or generator), the emf induced in the armature is proportional to the product of the air gap flux and the rotational velocity of the armature relative to the field poles. The electric constant of proportionality ($K_e$) depends on the number of series connected conductors of the armature. The term "conductors" refers to the segments of conducting wire of the armature windings which run perpendicular to the field flux. The constant $K_e$ will also depend on the geometry of the machine. Thus, the equation for the armature emf of a DC machine can be stated as $$E = K_e \times \phi \times V \tag{1}$$

where E is the induced emf, $\phi$ is the air gap flux and V is the rotational velocity of the armature relative to the field structure.

It can also be shown that the torque in a DC machine is given by the equation $$T = K_m \times \phi \times I_a \tag{2}$$

where T is the torque between the armature and the field structure, $K_m$ is the mechanical constant of proportionality and $I_a$ is the armature current.

It is a well known fact that the two above mentioned constants of proportionality, $K_e$ and $K_m$, are identical for the same DC machine. Thus, the two equations for an elementary DC machine become $$E = K \times \phi \times V \tag{3}$$

and $$T = K \times \phi \times I_a \tag{4}$$

Equations (3) and (4) are valid for any DC machine in which the armature conductors move perpendicular to the lines of magnetic flux generated by the field poles. They depend on the machine configuration only to the extent that the individual variables depend on that configuration. Hence, equations (3) and (4) may be applied to EMTC 10 to describe both the primary armature 20 action with respect to the field rotor 30 and the secondary armature 58 action with respect to the field rotor 30 as follows:

$$E_{a1} = K_1 \times \phi_1 \times V_1 \tag{5}$$

$$E_{a2} = K_2 \times \phi_2 \times V_2 \tag{6}$$

$$T_1 = K_1 \times \phi_1 \times I_1 \tag{7}$$

$$T_2 = K_2 \times \phi_2 \times I_2 \tag{8}$$

where $E_{a1}$ is the induced emf of the primary armature 20, $E_{a2}$ is the induced emf of the secondary armature 58, $T_1$ is the torque exerted from the primary armature onto the field rotor 30, $T_2$ is the torque exerted from the secondary armature 58 onto the field rotor 30, $K_1$ is the constant of proportionality for the primary armature/field rotor combination, $K_2$ is the constant of proportionality for the secondary armature/field rotor combination, $\phi_1$ is the flux in the primary armature/field rotor air gap, $\phi_2$ is the flux in the secondary armature/field rotor air gap, $V_1$ is the rotational velocity of the primary armature 20 with respect to the field rotor 30, $V_2$ is the rotational velocity of the field rotor 30 with respect to the secondary armature 58, $I_1$ is the current through the primary armature 20 and $I_2$ is the current through the secondary armature 58.

It should be noted here that, although the input torque is equivalent to the torque $T_1$, the output torque is not $T_2$. The output torque, the torque on the field rotor 30, will be the sum of all torques acting on the field rotor. Hence, the output torque is equal to $T_1 + T_2$.

As hereinbefore mentioned, the air gap fluxes in the primary and secondary air gaps 64 and 66 (FIG. 1) are assumed to be of equal magnitude and identical to the field flux. It follows, therefore, that for the primary armature 20 of EMTC 10, equations (1) and (2) may be rewritten $$E_{a1} = K_1 \times \phi \times (V_{a1} - V_r) \quad (9)$$

$$T_1 = K_1 \times \phi \times I_{a1} \quad (10)$$

where $K_1$ is the electrical constant for the primary armature/field rotor combination; $(V_{a1} - V_r)$ is the rotational velocity of the primary armature 20 relative to the field rotor 30, $V_{a1}$ being the absolute velocity of the primary armature and $V_r$ being the absolute velocity of the field rotor 30; and $\phi$ is the air gap flux.

Similar conclusions can be drawn concerning the interaction of the secondary (stationary) armature 58 and the field rotor 30. It makes little difference that the armature surrounds the field instead of vice versa. The end result—that the armature windings cut the field flux—remains the same.

There is, however, one fundamental difference. The number of conductors connected in series in the secondary armature 58 is not constant. Hence, although equations (3) and (4) hold, K is not, strictly speaking, a constant. To represent this mathematically, let $K = f(p) \times K_2$, where p is the number of secondary armature conductors in series at any given instant and $f(p)$ is some arbitrary function of p, and $K_2$ represents the geometry-dependent parameters of K.

Accordingly, the equations for the secondary armature 58 are $$E_{a2} = f(p) \times K_2 \times \phi \times V_r \quad (11)$$

and $$T_2 = f(p) \times K_2 \times \phi \times I_{a2} \quad (12)$$

where $V_r$ is the rotational velocity of the field rotor 30 and $I_{a2}$ is the current through the secondary armature 58, and $\phi$ is the secondary air gap flux which, as mentioned previously, is identical in magnitude to the primary air gap flux.

To understand $f(p)$, consider this: If one were to double the number of secondary armature conductors which interact with a given local field flux, one would, in effect, be doubling the constant $K_e$. Hence, $f(p)$ would be simply p. In practice, however, as one increases p, the average local field flux under the additional conductors will decrease. The effect is the same as if, instead of doubling the number of series connected conductors, one increases them by somewhat less than a doubling but retains the same average field flux. The controller 59 can easily compensate for any nonlinearity in the function $f(p)$, but for convenience sake one may consider $f(p)$ to be approximately equal to p.

Now variables V and I are independent of the configuration of the particular device. K, on the other hand, is determined by the design of the particular machine and will be determined substantially by the number of windings in the armature. Within limits, then, the designer is free to choose K arbitrarily for each armature. By appropriate selection of the constants $K_1$ and $K_2$, the designer may define certain critical characteristics of the response of the EMTC 10. The importance of these two constants will become obvious in the discussion hereinafter of the controller 59.

The design of the EMTC 10 and the operation of the controller 59 are such that the operation of the secondary armature 58 relative to the field rotor 30 is a motoring action of the field rotor in the same direction as the rotation of the input shaft 12. The fact that the secondary armature/field rotor combination constitutes a motor and that the primary armature/field rotor combination constitutes a generator makes no difference in equations (9) through (12).

The signs of the E and T terms of the foregoing equations are determined by the connections at the terminals of the primary armature 20 and secondary armature 58. One is, therefore, at liberty to choose them arbitrarily as positive.

The set of equations (9), (10), (11) and (12) are the four equations hereinbefore mentioned as being characteristic of the system and determinative of the design and operation of the controller 59. If one simply assumes losses proportional to the power input, then these equations alone model the system quite suitably for the steady state and for slowly varying conditions. As will become apparent hereinafter, the transient response of EMTC 10 points to a need for additional equations in order to take into account the inductance and resistance of the electrical circuitry involved.

To simplify the description of controller 59, the device has been divided into two stages. The first stage is shown in FIG. 6. In this diagram, $V_{out}$ is the rotational velocity of output shaft 44 and $V_{in}$ is the rotational velocity of input shaft 12. $V_{ref}$ is the reference setting for the rotational velocity of input shaft 12, and $V_{comp}$ is a complementary reference value. $R_c$ and p are the controlled variables. It will be evident from the earlier discussion of FIG. 3 that $R_c$ is a variable resistor which controls the current to auxiliary field winding 42. The other controlled variable, p, controls the number of series connected conductors in secondary armature 58. The second stage of controller 59 is shown in FIG. 7, wherein the input lines p correspond to the output lines p of the controller first stage shown in FIG. 6.

Figure 6:
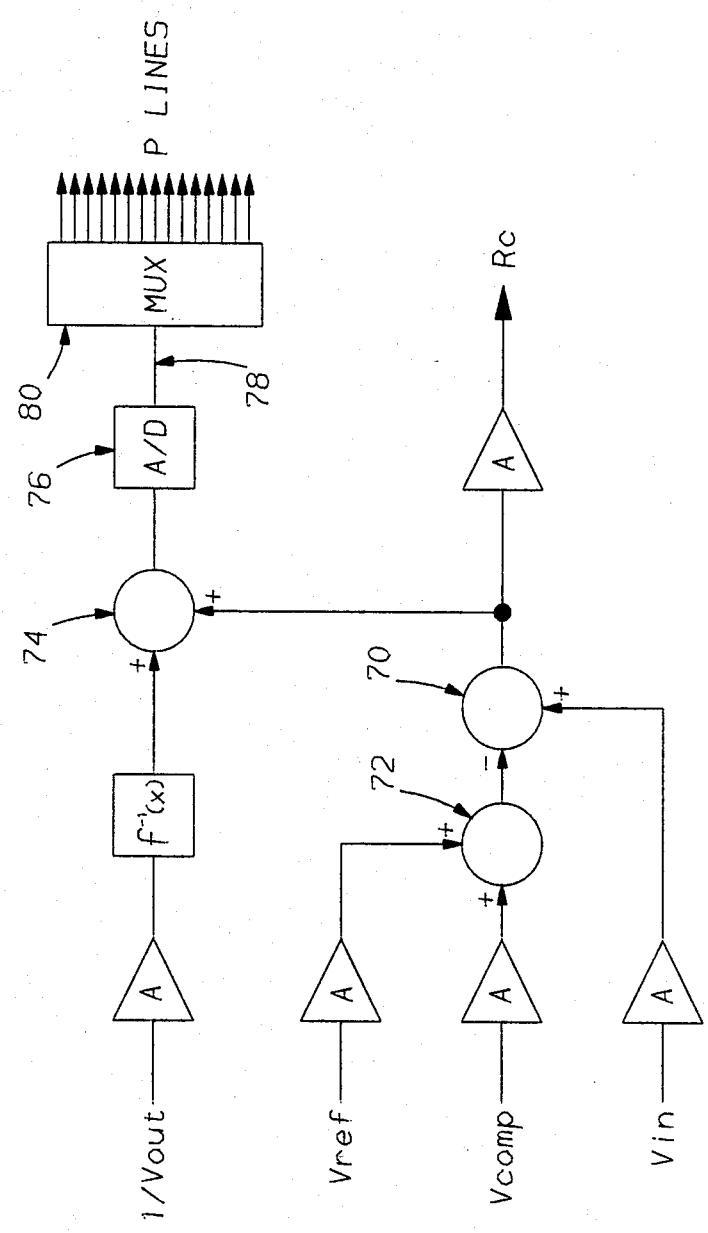
FIG. 6 and FIG. 7 are schematic circuit diagrams of first and second stages, respectively, of a controller suitable for controlling the performance of an apparatus embodying the present invention.

FIG. 6 shows one example for the first stage of controller 59 of EMTC 10. Other configurations of this stage will be more appropriate for different response requirements. The configuration shown in FIG. 6 would be most suitable for power transmissions where the input shaft rotational velocity (as opposed to the input torque, for example) must be controlled. It should be noted, in this connection, that EMTC 10 has a tremendous advantage over typical transmissions, even standard electromagnetic transmissions. Because the secondary armature 58 is configured according to an algorithm specified by a digital controller, the EMTC 10 may be programmed very easily to accommodate various response requirements, including constant torque according to power output, linearly increasing torque according to power output, etc.

$V_{ref}$ is chosen to represent some optimum operating speed of the prime mover that drives input shaft 12. Controller 59 continuously compares this parameter with the actual input shaft speed $V_{in}$ in a comparator 70 and makes any necessary changes (analogous to gear shifting). Often, however, the optimum operating speed of the prime mover varies. Internal combustion engines, for example, develop maximum power at a speed higher than that at which they are most efficient. To always maintain optimum speed in such cases, an additional reference input to moderate the original reference input is necessary. This is the function of the complementary input, $V_{comp}$. Carburetor vacuum, for example, would correspond to a complementary reference input if the prime mover were an internal combustion engine. The moderation is effected in an electronic summing block 72 to which amplified versions of signals representing $V_{ref}$ and $V_{comp}$ are fed and from which a moderated $V_{ref}$ signal is fed to comparator 70.

The absolute rotational velocity of input shaft 12 and the rotational velocity of output shaft 44 constitute feedback variables for controller 59. The reciprocal of the output shaft speed; i.e., $1/V_{out}$, will determine the steady state value of the controlled variable p. The function $f^{-1}(x)$ is necessary to keep FIG. 6 consistent with equation (11). The error signal, which is the difference between the moderated (complemented) reference input to comparator 70 and the actual input shaft speed $V_{in}$ input thereto, will bias the value of p outputted from the function block $f^{-1}(x)$ in such a way as to reduce the error signal. This error signal will also control resistance $R_c$ (see FIG. 3) which, in turn, will dictate the auxiliary flux to be superimposed on the flux generated by the main field windings 40. The biasing of the value p takes place in a functional adding block 74 and the biased value p, in analog form, enters the analog-to-digital converter 76 to emerge on an input bus 78 to a multiplexer 80 having, in this example, an eight-line output, only one line of which at a time is energized (high) to indicate p values from one to eight; i.e., 1p to 8p. The p lines of FIG. 6 continue with the p lines of FIG. 7, which will now be discussed.

Among the several functions of controller 59 is the selection of the number of series connected conductors of the secondary armature 58. In the equations modeling the secondary action, equations (11) and (12), the effect of this selection function will correspond to the value assigned to the variable p. FIG. 7 shows the general structure of the second stage of controller 59. Unlike the first stage, the structure of the second stage is relatively independent of the response requirements of the system. The second stage is responsible for translating the information on the p lines to gate signals which establish the appropriate electrical connections in secondary armature windings.

Figure 7:
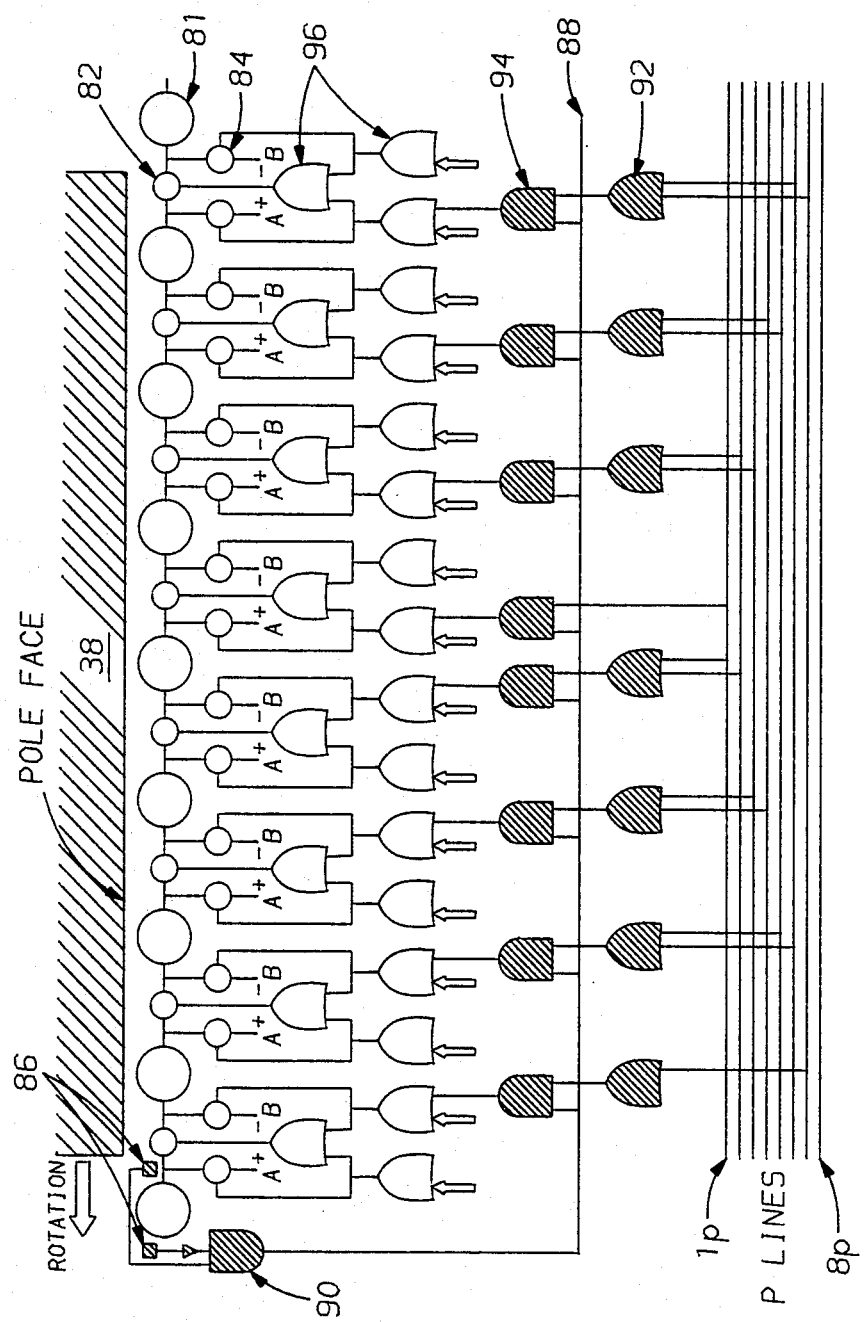
Figure 8:
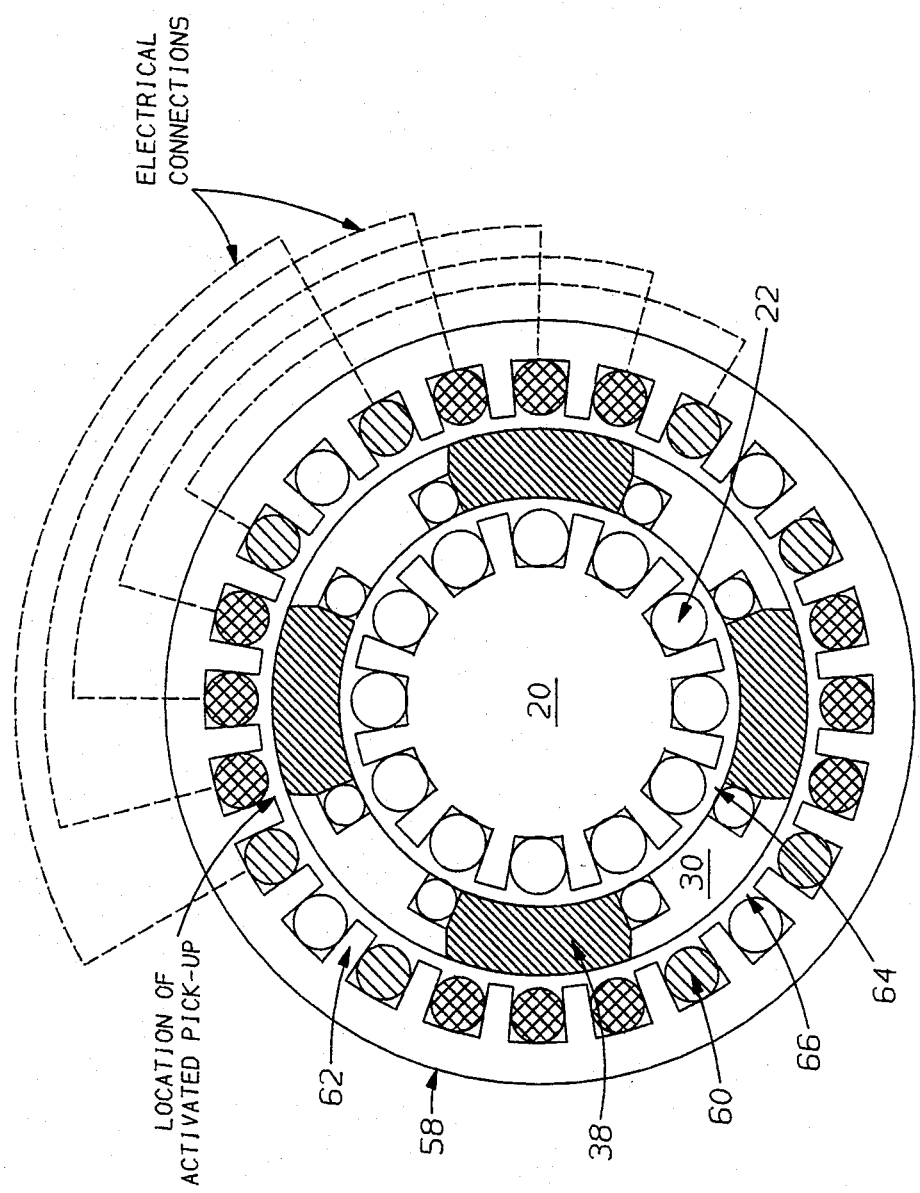
FIG. 8 is a cross-sectional view like that of FIGS. 2 and 5, but showing two configurations of secondary armature windings occurring for two values of the controlled variable p and for a given field rotor position.

FIG. 7 is only a partial representation of the circuitry involved, but will be sufficient to describe the action of the system. The larger circles numbered from 1 to 9 represent coils 81 of several turns each, the total collection of which defines the secondary armature winding 60. These coils may be connected in series by the normally-on relays 82 represented by the smaller circles intermediate coils 1 to 9. The like smaller circles represent normally-off relays 84. The normally-off relays 84 connect the coils 81 to the voltage potentials at terminals A and B of FIG. 3. Both relays 82 and relays 84 will be capable of handling moderate voltage drops and large currents while all other parts of the controller will operate at standard TTL levels. The secondary armature core 62 is not shown in FIG. 7.

The small squares next to coils 7 and 9 represent magnetic pickups 86. Assuming it is of a particular polarity, the pole face 38, which in FIG. 7 is moving to the left, will activate a pickup 86 as its left edge passes over that pickup. The secondary armature flux will be too weak to activate the pickups 86.

Standard notation for AND and OR gates and for inverters is used in FIG. 7. The shaded elements show circuit configurations which must be repeated for each coil; only the circuitry for coil 9 is shown, and only eight coils are depicted as being connected to the circuitry. In the more practical case, many more coils would occupy the region under a pole face. In the unshaded circuitry, the arrows indicate other inputs from circuitry identical to that shown for coil 9. For the nine coils 81 shown, this unshaded circuitry is complete.

Figure 12:
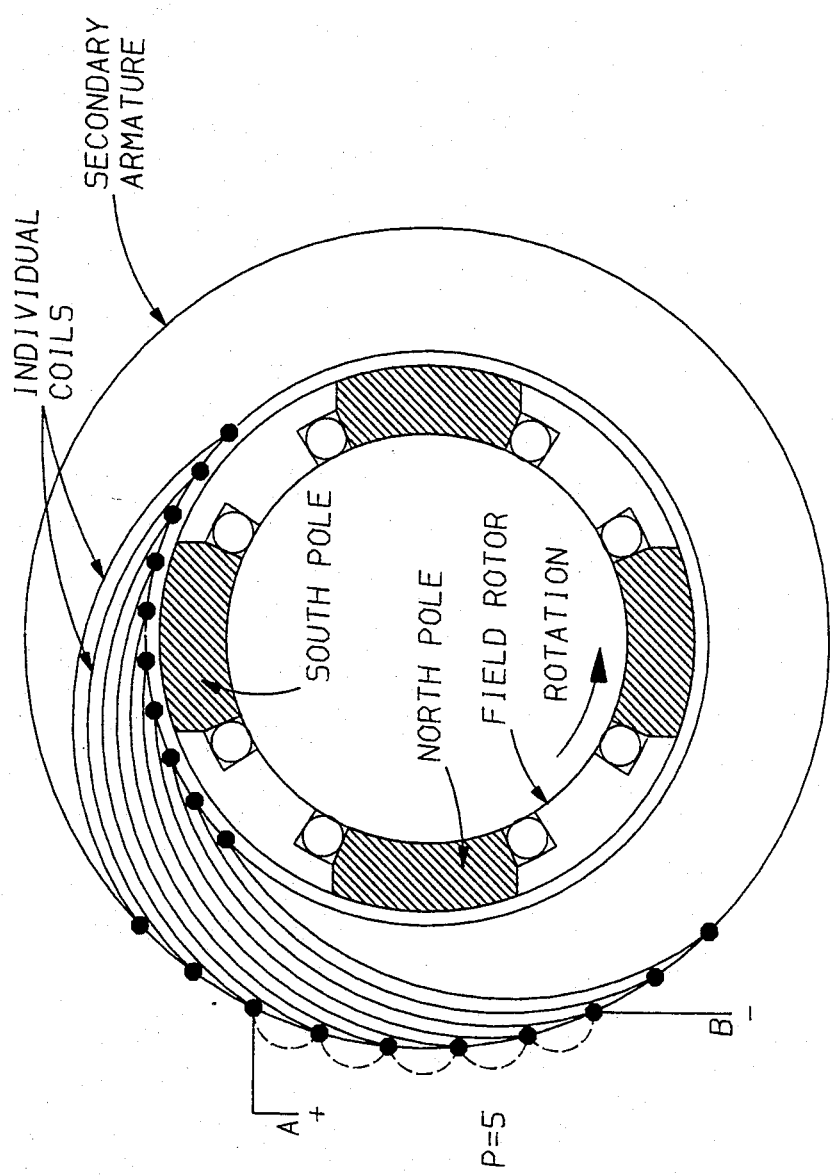
FIG. 12 is a diagram of a coil configuration obtainable in the secondary armature.

Either north poles or south poles, but not both, activate pickups 86. This is because each conductor of secondary armature 58 will be part of a coil so wound that when this conductor is under a north pole, the loop containing the conductor also contains a conductor carrying current in the opposite direction and which will be in a corresponding position under a south pole. In other words, for each set of conductors, the controller 59 selects under a north pole, a corresponding set of conductors is selected under a south pole (see FIG. 12).

The functioning of the arrangement shown in FIG. 7 is rather simple. If the pole face 38 is over the magnetic pickup 86 adjacent coil 7 but not yet over the pickup 86 adjacent coil 9, the locate line 88 which is the output line of AND gate 90 whose inputs are from the two magnetic pickups 86 will be high. Now suppose that the number one p line is the p line that controller 59 has exclusively selected to be high. By simultaneously tracing the two high signals on the 1p line and on the aforementioned locate line 88 through the shaded OR and AND gates 92 and 94 and the unshaded OR gates 96, one can see that the plus and minus power lines A and B to either side of coil 1 are connected to the terminals of coil 1. In addition, the normally-on relays 82 to either side of coil 1 are now off, isolating coil 1 from the others.

In a similar fashion, one sees that when the number two p line is high, coils 1 and 2 are connected in series to the power lines A and B and all other coils are open circuited. The isolation of the coils is necessary to prevent induced voltages and stray currents in these coils from dissipating power. By logical induction, one can readily appreciate how the entire system works.

In a four-pole machine, two locate lines will be high; hence two separate sets of coils will be activated. These sets may be connected in series or parallel, but here it will be assumed that the connection is parallel (FIG. 11A).

One should note that the nth p line's high state does not indicate that the variable p, as defined previously, has the value n. Consider, for instance, a four-pole machine with two parallel paths through the secondary armature (see FIGS. 11A and 11B). Suppose each coil of the winding has ten turns (twenty conductors, ten under a north pole and ten under a south pole). Now if controller 59 dictates a p value of one hundred and twenty total conductors, six coils would need to be activated. However, there are two parallel paths through the secondary armature 58 and hence two sets of secondary armature coils will be activated by a single p line being high. Therefore, three coils per set are necessary, and hence the third p line will be high.

In the steady state of operation of the system, the field flux is produced solely from the main field winding 40. The control resistance $R_c$ will be set to zero ohms, so that no current will flow through the series auxiliary field winding 42 (see FIG. 3). Since the resistance and inductance of primary armature 20 and secondary armature 58 are rather small (typical of most DC machines), one may neglect for the moment any current drawn from the circuit by the main field winding 40. It should be obvious from FIG. 3 that such assumptions will lead to the conclusion that $E_{a1}$ is equal to $E_{a2}$ and that $I_{a1}$ is equal to $I_{a2}$.

Using the equality of $E_{a1}$ to $E_{a2}$ and setting the right sides of equations (9) and (11) equal to each other, it is found that $$V_{a1} - V_r = (K_2/K_1) \times f(p) \times V_r \tag{13}$$

and by dividing both sides of equations (10) and (12) by $K_1O$ and $f(p) K_2O$, respectively, and using the equality of $I_{a1}$ to $I_{a2}$ it is also found that $$T_1 = K_1 \times T_2/K_2 \times f(p) \tag{14}$$

Letting $K = K_2/K_1$, one obtains $$V_{a1} = [K \times f(p) + 1] \times V_r \tag{15}$$

and $$T_1 = T_2/f(p) \times K \tag{16}$$

The above equations indicate that by varying p one can achieve various torque ratios in the steady state. Equations (13) and (14) also indicate the importance of the relative independence of $K_1$ and $K_2$ to the design flexibility of EMTC 10.

To fully understand the operation of controller 59, one must examine the transient behavior of the EMTC 10. To determine quantitively the transient behavior of the system, one must use a much more sophisticated model of the system taking into account the effects of resistances and inductances of the primary and secondary armatures 20 and 58 and the time lags of the two controlled variables $R_c$ and p. The solution of such a model will require a finite difference computer approximation. A qualitative insight into the operation of controller 59 can be had, however, from the following analysis.

Suppose an internal combustion engine, which is to operate at constant speed, is connected to the input shaft 12 of EMTC 10, and suppose a speed dependent load is placed on the output shaft 44. If the system is initially operating at constant power input and at constant speed, and suddenly an attempt is made to accelerate the load by opening the throttle of the engine, the initial power increase delivered to the transmission will manifest itself as an increase in the rotational velocity $V_{in}$. In this respect, the increase in torque on the input shaft 12 necessary to achieve the constant speed condition will lag the speed increase, since the current necessary to establish this torque will be retarded due to the armature impedances and controller response lag.

Let us assume for the moment that the controlled variable resistance $R_c$ is to remain zero. As the speed of input shaft 12 increases an incremental amount, two separate responses will be observed. Firstly, the induced emf of primary armature 20 rises. Secondly, the error signal produced from comparing the reference signal ($V_{ref}$) with the input shaft speed $V_{in}$ will cause controller 59 to reduce the number of series connected windings of secondary armature 58 (i.e., reduce the value of p) so as to reduce the induced emf of secondary armature 58. The net result of these two occurrences will be a tendency for the current flowing from primary armature 20 to secondary armature 58 to increase. As the current increases, so will both the input torque $T_1$ and the total torque $(T_1 + T_2)$. This tendency will outweigh a tendency for the secondary torque $T_2$ to decrease due to the decrease in the value of p.

The increase in the primary torque $T_1$ will tend to return input shaft 12 to its reference rotational velocity $V_{ref}$ and, at the same time, the net output torque $(T_1 + T_2)$ will tend to accelerate the output shaft 44. The system will eventually come to equilibrium at a new output shaft speed $V_{out}$ and a new output shaft torque $(T_1 + T_2)$.

If the armature inductances and the controller time lags are negligible, the current through primary armature 20 and secondary armature 58 will respond immediately to any changes in the speed of input shaft 12. The torques $T_1$ and $T_2$ exerted on field rotor 30 by primary armature 20 and secondary armature 58, respectively, which depend on the armature circuit current will also respond immediately, whereby the system's response time is negligible. A sudden opening of the throttle on the internal combustion engine will accordingly cause no significant increase in the input shaft speed $V_{in}$, and the increased power input will be perceived immediately as an increased power output.

If, however, the armature inductances and the controller time lags are significant, the armature current will not build up fast enough to increase the torque $T_1$ to prevent the input shaft rotational velocity $V_{in}$ from exceeding acceptable levels. One way to prevent such an occurrence is to use the controlled variable resistance $R_c$ to adjust the field flux (see FIGS. 3 and 6). By increasing resistance $R_c$, armature current is diverted to the auxiliary field winding 42. Since auxiliary field winding 42 would be designed to carry up to the full armature current, only a small inductance will be necessary to create a relatively large magnetic flux. This small ratio of inductance to field flux accounts for a very fast response of the field flux to adjustment of the controlled variable resistance $R_c$. The flux thus produced will supplement the field flux of the main field winding 40. Because the torque $T_1$ exerted by primary armature 20 on field rotor 30 is proportional to the field flux, the torque on the input shaft 12 will experience the necessary rise and prevent input shaft 12 from accelerating to unacceptable levels. As the armature circuit current and controller 59 begin to respond, the controlled variable resistance $R_c$ can be removed from the armature circuit altogether.

One function of controller 59 of the EMTC 10 is to ensure a fast and smooth response of the EMTC to any changes in the power output of the prime mover (power input to the EMTC). This means that there should be no convulsive changes or oscillations in the torque on output shaft 44 due to a changing power input to the EMTC. The transmission's response speed will be an indicator of how much the input shaft 12 is allowed to vary from its reference rotational velocity $V_{ref}$ as the power input changes.

The smoothness or stability of EMTC 10 depends on three system parameters: the time constants of the electrical circuit, including the time lags of controller 59; the mechanical time constant; and the gain on the control feedback signals due to the amplifier function blocks in FIG. 6. A large mechanical time constant will tend to damp the response of output shaft 44 and enhance stability. A small electrical time constant will allow the electrical portion of the system to respond quickly and, therefore, improve the time response of the system. A large value of feedback gain will quicken the response for the system, but adversely affect the stability thereof.

The ideal situation would occur if the armature inductances $L_{a1}$ and $L_{a2}$ could be made very small and the time lags of controller 59 made negligible. Such a system would always remain stable, since the mechanical time constant would always dominate the electrical time constant. Fortunately, for most practical applications this is the case.

A special instance that must be considered involves the acceleration of output shaft 44 from zero rotational velocity. The minimum steady state rotational velocity $V_{rmin}$ of output shaft 44 can be calculated from equation (15) as $$V_{rmin} = V_{a1}/[f(p)_{max} \times K] + 1 \quad (17)$$

where $p_{max}$ is the maximum value of p. If output shaft 44 is accelerated from rest, a large torque will suddenly appear at output shaft 44 in order to achieve this minimum speed $V_{rmin}$ even if the power input is small. To smooth out this acceleration, a clutch effect is simulated.

Figure 9:
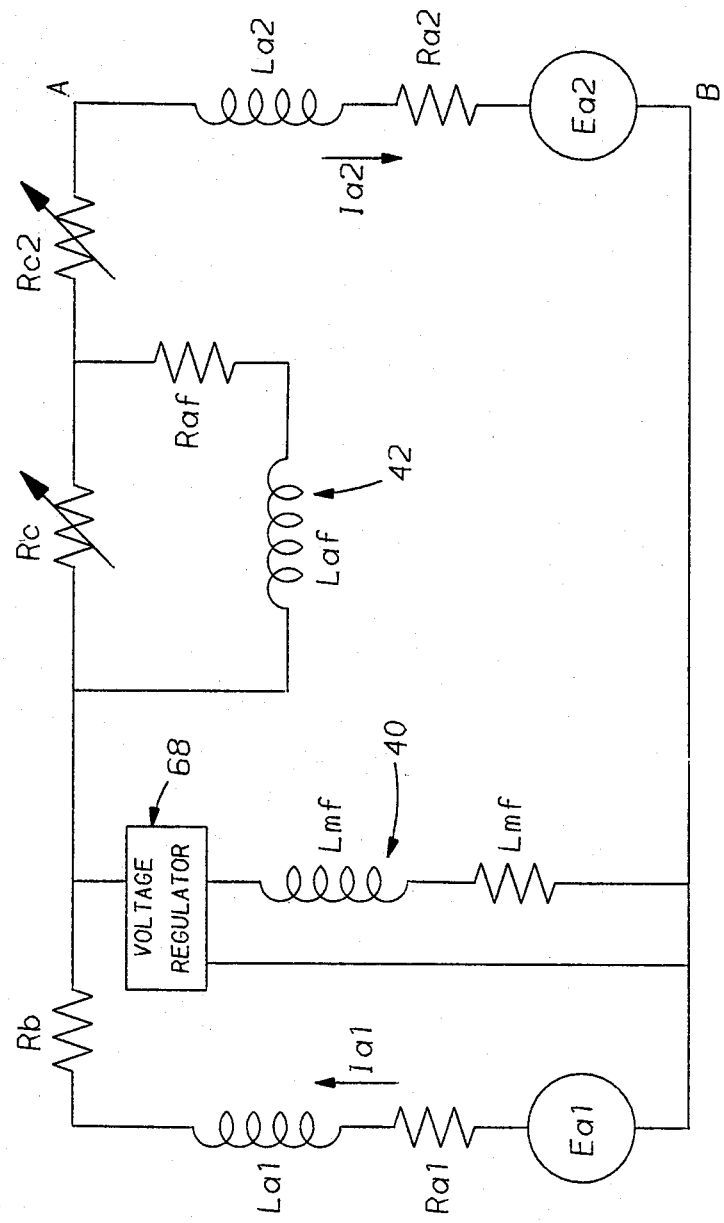
FIG. 9 is a schematic circuit diagram differing from that of FIG. 3 by the addition of an acceleration control resistance.

By placing a control resistor $R_{c2}$ in the armature circuit, as shown in FIG. 9, the current between the primary and secondary armatures 20 and 58—and hence the primary and secondary torques—can be controlled. This armature circuit resistor $R_{c2}$ serves as an acceleration control resistance and can be made inversely proportional to the speed of output shaft 44 and be cut out completely at $V_{rmin}$ as defined above. The control unit is shown in FIG. 10. In addition to the inverse proportionality of acceleration control resistance $R_{c2}$ to the output shaft velocity $V_{out}$, the resistance is also shown as being moderated by the complementary reference input $V_{comp}$, whereby $R_{c2}$ is reduced still further when quick accelerations are desired.

Reverting to the secondary armature winding relays 82 and 84 that serve to configure the winding, as described in conjunction with FIG. 7, a further example of the conditions under which the relays operate will now be given. A four pole field rotor and a secondary armature winding with one-thousand turns of wire divided into one-hundred coils of ten turns each are assumed with a relay between each of the coils. Two additional relays for each coil connect any arbitrary set of coils to the rest of the armature circuit (see FIGS. 7 and 12). Recalling that the controlled variable p indicates the number of active conductors, the number of conducting relays in the armature circuit at any time (except during switching of the relays) can be expressed as $(p/20)+4$; one relay 82 between adjacent coils (twenty conductors each) and two sets of two relays 84 each to connect the two sets of series connected coils to the armature circuit. The two sets of coils of the secondary armature of the four pole machine are connected in parallel—see FIGS. 8 and 11A. Since a coil covers both a north and south field pole, only relays under either a north pole or a south pole will be conducting. With only north poles activating pickups 86, only relays 82 between coils that are under north poles can be conducting. Active conductors under south poles will be portions of coils with conductors under north poles (see FIG. 12). If one considers any conductor as being "under" a particular pole if it is simply closer to that pole than to an adjacent pole, then no more than fifty-four of the three-hundred relays will be conducting at once; a maximum of twenty-five relays 82 between coils under each north pole; and four relays 84 connecting the coils to the rest of the armature circuit. The number of conducting relays is not equal to the number of activated relays, since relays 82 between the coils are normally ON. The activated relays always number eight—four connecting coils to the armature circuit plus four isolating the rest of the coils.

A noteworthy characteristic of EMTC 10 is the large number of "gears" (possible values of p) available. In effect, the transmission is continuously variable, say with twenty-five "gears" as occurs when a maximum of twenty-five coils are under a given pole piece. However, if in a particular case the available "gears" are insufficient, it would be a simple matter to adapt controller 59 to bridge the gap between "gears" by control of the field flux. Such a controller would function optimally with a slowly accelerating load, which would likely be the case if it were determined that the twenty-five "gears" available could not handle the acceleration demands. In mathematical terms, the rotational velocity $V_r$ of output shaft 44 in equation (11) can be chosen arbitrarily if one allows the field flux $\phi$ to vary by $[f(p+1)-f(p)]f(p)$ when $V_r$ lies between $E_{a2}/[f(p) \times K_2 \times \phi_{normal}]$ and $E_{a2}/[f(p+1) \times K_2 \times \phi_{normal}]$ for some value of p. Here all variables are defined as for equation (11), and $\phi_{normal}$ is the base value for the field flux.

Although other electromagnetic transmissions claim to be infinitely variable, this quality is achieved at the expense of creating other deficiencies. Although able to vary the speed of the output shaft, they are unable to maintain a uniform, maximum power output over their entire speed range.

Controller 59 enjoys a flexibility that is due to the mathematical manipulation to which electrical signals, either digital or analog, are well suited. In other words, given the graphs of any variables $y_1$ and $y_2$ (e.g., $R_c$ and p) as a function of input and feedback variables $x_1$, $x_2$, $x_3$, ... (e.g., $V_{out}$, $V_{in}$, $V_{ref}$...) can always construct a controller 59 capable of duplicating this graph (see FIGS. 6, 9 and 10).

As an example, consider the prime mover (internal combustion engine) previously discussed. This engine is to rotate at a speed which is some function of its power output. That is, at no load the engine rotates at, say, one-thousand RPM and at full load two-thousand five-hundred RPM, though the graph of this function need not be a straight line. Controller 59 of EMTC 10 examines the carburetor vacuum and computes the correct engine speed. If this reference value for the speed does not match the actual speed of the engine, controller 59 changes "gears" in the transmission to return the engine to its proper operating speed.

If, however, a prime mover is specified whose torque is not to vary from a given value, then the first stage (FIG. 6) of controller 59 would be quite different. The rotational velocity of the engine would then have no significance to controller 59; the input torque would constitute the sole feedback variable, whilst some arbitrary torque would constitute a reference (input) variable.

The Ward-Leonard electromagnetic transmission system is well-known and employs three machines, each having a power rating at least that of the prime mover. The total power rating is accordingly one third the rating of the sum of the power ratings of the individual components. More compact and economical prior art electromagnetic transmissions employ planetary gearing to allow part of the load to be transferred mechanically. This, in turn, allows smaller armatures to be used and provides somewhat better efficiency, since there is less conversion from mechanical to electrical energy and again back to mechanical energy.

EMTC 10 does not employ any planetary gearing, but nevertheless, preserves the advantage of minimum conversion to electrical energy. The reason for this is that of the two torques which combine to form the output torque, only the secondary torque is the result of an electrical current—the torque from the primary armature 20 to the field rotor 30 is the cause of this electrical current. Thus, whereas the two torques combine to produce the output torque, only the secondary torque is responsible for an electrical power consumption. This would not be possible if the components were not concentric with one another.

To determine the electrical power, the product $V \times I$, transferred between the armatures 20 and 58, one simply solves equation (12) for $I_{a2}$ and multiply the result by the right side of equation (11). The product is simply $T_2 \times V_r$, the mechanical power transferred to the field rotor 30 by the secondary armature 58. To determine what percent of the total power this represents, one divides it by $(T_1+T_2) \times V_r$ which is the power at the output shaft 44. Thus, the power transferred through the armature circuit is $T_2/(T_1+T_2)$. This value will vary over the operating range of EMTC 10, since the ratio $T_2/T_1$ is not constant. While the foregoing analysis neglects the effects of mechanical and electrical losses, such effects are not critical to the analysis.

What is claimed is:

1. An electromagnetic transmission comprising three generally cylindrical structures concentrically disposed about a common longitudinal axis; the inner structure being a rotatably mounted primary armature having an input shaft extending along said axis for connection to a prime mover capable of rotating said primary armature about said axis; the intermediate structure being a rotatably mounted field member having an output shaft extending along said axis for connection to a mechanical load, and having an even number of pole shoes surrounded by main and auxiliary windings, the main windings being connected in parallel with the primary and secondary armature windings and the auxiliary windings, connected in series with said armature windings, being associated with a variable shunt resistor whose resistance at any time is determined by the controller as one of two controlled variables; and the outer structure being a stationary secondary armature the windings of which are arranged to be controlled in their configuration by a system of electrical relays capable of continuously adjusting the number of secondary armature conductors connected in series.

2. An electromagnetic transmission according to claim 1, wherein said controller is arranged to adjust the value of said variable shunt resistor in accordance with deviations of the rotational velocity of said input shaft from a reference value.

3. An electromagnetic transmission according to claim 2, wherein means are provided for complementing said reference value to compensate for variations in the optimum operating speed of a prime mover connected in driving relation to said input shaft.

4. An electromagnetic transmission according to claim 1, wherein said controller is arranged to adjust the other of said two controlled variables in accordance with the reciprocal of the rotational velocity of said output shaft, the velocity of said output shaft corresponding to one of the predetermined performance parameters of said transmission.

5. An electromagnetic transmission according to claim 4, wherein said controller is provided with a first stage having means for attending to the adjustment of the first and other controlled variables, a second stage being provided including selection means responsive to said other controlled variable and the instantaneous rotational position of a pole face of said field member for connecting selected ones of said secondary armature conductors in series with one another.

6. An electromagnetic transmission according to claim 5, wherein said selection means includes a magnetic pickup on each side of a coil formed from a set of said secondary armature conductors, said pickups generating respective signals in response to magnetic flux received from a pole face of said field member as the imaging edge of said pole face rotates past said pickups; electrical relays activatable for connecting coils in series and for isolating the series connected coils from the rest of the coils; and logic devices for activating selected ones of said relays in dependence upon signals received from said pickups and signals representing said other controllable variable.

7. An electromagnetic transmission according to claim 6, wherein the maximum number of coils receiving magnetic flux from a given pole face of said field member is the number of possible values of said other controllable variable.

8. An electromagnetic transmission according to claim 7, wherein said pickups produce signals solely in response to magnetic flux of one polarity.

9. An electromagnetic transmission according to claim 1, wherein said variable shunt resistor is connected across the auxiliary field winding to be in parallel with the impedance of said auxiliary field winding, there being provided a second controllable variable resistor in series with the parallel combination of the first mentioned variable resistor and winding impedance for controlling the acceleration of said output shaft upon having its value adjusted in inverse proportion to the rotational velocity of said output shaft.

* * * * *